United States Patent [19]

Monroe et al.

[11] Patent Number: 4,770,671
[45] Date of Patent: Sep. 13, 1988

[54] ABRASIVE GRITS FORMED OF CERAMIC CONTAINING OXIDES OF ALUMINUM AND YTTRIUM, METHOD OF MAKING AND USING THE SAME AND PRODUCTS MADE THEREWITH

[75] Inventors: Larry D. Monroe, Inver Grove Heights; William P. Wood, Minneapolis, both of Minn.

[73] Assignee: Minnesota Mining and Manufacturing Company, St. Paul, Minn.

[21] Appl. No.: 815,020

[22] Filed: Dec. 30, 1985

[51] Int. Cl.$^4$ .............................................. B24D 3/00
[52] U.S. Cl. ...................................... 51/293; 51/295; 51/309
[58] Field of Search ........................ 51/293, 309, 295

[56] References Cited

U.S. PATENT DOCUMENTS

| | | | |
|---|---|---|---|
| 4,217,113 | 8/1980 | Suh et al. | 51/309 |
| 4,252,544 | 2/1981 | Takahashi | 51/309 |
| 4,314,827 | 2/1982 | Leitheiser et al. | 51/298 |
| 4,331,627 | 5/1982 | Yamamoto et al. | 51/309 |
| 4,457,767 | 7/1984 | Poon et al. | 51/298 |
| 4,518,397 | 5/1985 | Leitheiser et al. | 51/293 |
| 4,543,107 | 9/1985 | Rice | 51/309 |
| 4,574,003 | 3/1986 | Gerk | 51/309 |

FOREIGN PATENT DOCUMENTS 49-2590  1/1974  Japan .

OTHER PUBLICATIONS

L. Coes, Jr., *Abrasives*, Springer-Verlag, 1971.

Primary Examiner—Paul Lieberman
Assistant Examiner—Willie J. Thompson
Attorney, Agent, or Firm—Donald M. Sell; Richard Francis

[57] ABSTRACT

Ceramic abrasive grits comprising alpha alumina and at least about 0.5 percent by weight yttria are prepared by mixing an aqueous dispersion of alpha alumina monohydrate and yttrium compound, gelling the resultant mixture, drying the gel to produce a dried solid, crushing the dried material to produce grits, calcining the dried grits to substantially remove bound volatile materials, and firing the grits to produce a ceramic material. The yttrium for the most part is in the form of a yttrium aluminum garnet. Abrasive products comprising the abrasive grits are also claimed as is a method of grinding a workpiece with such abrasive products.

40 Claims, No Drawings

ABRASIVE GRITS FORMED OF CERAMIC CONTAINING OXIDES OF ALUMINUM AND YTTRIUM, METHOD OF MAKING AND USING THE SAME AND PRODUCTS MADE THEREWITH

DESCRIPTION

1. Technical Field

This invention relates to the production of alumina-based ceramic abrasive grits, a method of making the same by a sol-gel process, abrasive products made with the abrasive grits and a method of using the abrasive products.

2. Background Art

Garnet is known to be an important naturally-occurring abrasive mineral, grits of which find use in large part in coated abrasive products. The garnet extensively used for abrasive purposes consists almost wholly of var.almandite, $Fe_3Al_2(SiO_4)_3$, with small amounts of pyrope, $Mg_3Al_2(SiO_4)_3$, in a solid solution. The term "garnet" has, in recent years, been broadened to include a class of non-siliceous mixed oxides composed of compounds of certain rare earth (e.g., Y, Gd) oxides with oxides of Fe or Al. These compounds have a garnet structure and have considerable interest in the electronic field but have not been considered as abrasives as recognized on pages 34–37, L. Coes, Jr., *Abrasives,* Springer-Verlag, 1971.

While yttria ($Y_2O_3$) has been included in a co-fused alumina zirconia abrasive, as disclosed in Poon et al, U.S. Pat. No. 4,457,767, there has been no disclosure of yttria or of a yttrium aluminum garnet in a ceramic abrasive material, particularly one made by a sol-gel process.

The preparation by a sol-gel process of dense, alumina-based ceramic abrasive grain is described, for example, in Leitheiser et al, U.S. Pat. No. 4,314,827, assigned to the assignee of the present application. This patent teaches making an abrasive mineral employing chemical ceramic technology by gelling alumina monohydrate with a precursor of at least one modifying component followed by dehydration and firing. The modifying component is selected from zirconia, hafnia, a combination of zirconia and hafnia, and a spinel derived from alumina and at least one oxide of cobalt, nickel, zinc, or magnesium. Minnesota Mining and Manufacturing Company, the assignee of the present application, markets sol-gel alumina based ceramic abrasive grits under the trade designation "Cubitron". Abrasive products containing "Cubitron" abrasive grits have been found to perform in a superior manner as compared to the best fused synthetic abrasive mineral in many applications. A typical example of a high performance fused synthetic abrasive mineral is formed of fused alumina-zirconia available, for example, under the trade designation "NorZon" from the Norton Company.

While sol-gel alumina-based ceramic abrasive mineral outperforms the fused alumina-zirconia mineral in many applications, it does not out perform fused synthetic alumina zirconia in abrading certain workpieces such as those made of stainless steel substrates.

SUMMARY OF THE INVENTION

The present invention provides ceramic abrasive grits formed by a sol-gel process which have superior abrasive performance in abrading certain workpieces such as those made of stainless steel, titanium, high nickel alloys, aluminum and others, and excellent performance on more conventional workpieces such as mild steel. The ceramic abrasive grits comprise alpha alumina and at least about 0.5% (preferably about 1% to about 30%) by weight yttria.

The ceramic abrasive grits are made by a process comprising the steps of:

a. mixing an aqueous dispersion of alpha alumina monohydrate and yttrium compound in an amount to provide at least about 0.5% by weight yttria upon firing;

b. gelling the resultant mixture;

c. drying the gel to produce a dried solid;

d. crushing the dried material to produce grits;

e. calcining the dried grits to substantially remove bound volatile materials; and f. firing the grits to produce a ceramic material.

It is believed that substantially all of the yttrium is present as yttrium aluminum garnet, although under certain conditions other crystal forms of yttrium aluminum oxide may exist or be present with the garnet. The yttrium content is reported as weight percent of yttria ($Y_2O_3$) for convenience even though it does not necessarily exist as such in the ceramic because it usually is in the garnet form.

DETAILED DESCRIPTION

The preparation of the ceramic abrasive grits of the present invention from a sol-gel process includes the preparation of a dispersion usually comprising about 2 to about 60 weight percent alpha aluminum oxide monohydrate (boehmite). The boehmite can either be prepared from various techniques well known in the art or can be acquired commercially from a number of suppliers. Examples of commercially available materials include that available under the trade designation "Disperal" produced by Condea Chemie, GMBH and that available under the trade designation "Catapal" S.B., produced by Vista Chemical Company. These aluminum oxide monohydrates are in the alpha-form, are relatively pure, include relatively little, if any, hydrate phases other than the monohydrate, and have a high surface area.

A peptizing agent is usually added to the boehmite dispersion to produce a more stable hydrosol or colloidal dispersion. Monoprotic acids or acid compounds which may be used as the peptizing agent include hydrochloric, acetic, and nitric acid. Nitric acid is a preferred peptizing agent. Multiprotic acids are normally avoided since they rapidly gel the dispersion, making it difficult to handle or mix with additional components. Some commercial sources of boehmite certain acid titer, such as absorbed formic or nitric acid, to assist in forming a stable dispersion.

Sufficient yttrium compound is added to the dispersion to provide at least about 0.5% by weight and preferably about 1 to 30% by weight yttria after firing. The preferred yttrium compound is a salt of a volatile anion. Yttrium salts having volatile anions include, for example, yttrium nitrate, yttrium formate, yttrium acetate and the like. The most readily available yttrium compound is yttrium oxide which is easily converted to a yttrium salt with a volatile anion by reaction with an excess of concentrated nitric acid to produce yttrium nitrate hexahydrate solution which can conveniently be introduced into the alpha aluminum oxide monohydrate dispersion in the desired amount. Yttrium salts and compounds which remain stable and have anions which do not volatilize at least at the firing temperature of the ceramic material should be avoided since they generally do not react with alumina to form the yttrium-aluminum garnet. The yttrium compound may also be yttria, for example, as finely divided hydrated particles as in a sol.

The alpha aluminum oxide monohydrate may be formed by any suitable means which may simply be the mixing of the aluminum oxide monohydrate with water containing the peptizing agent or by forming an aluminum oxide monohydrate slurry to which the peptizing agent is added. Once the dispersion is formed, it is preferably then gelled. The gel can be formed by any conventional technique but is preferably formed by adding the yttrium salt in sufficient concentration as to cause the dispersion to gel.

The dispersion may contain a nucleating agent to enhance the transformation to alpha alumina. Suitable nucleating agents include fine particles of alpha alumina, alpha ferric oxide or its percursor and any other material which will nucleate the transformation. The amount of nucleating agent is sufficient to effect nucleation. Nucleating such dispersions is disclosed in assignee's copending application Ser. No. 728,852 filed Apr. 30, 1985, the disclosure of which is incorporated herein by reference.

The dispersion may contain one or more precursors of one or more other modifying additives which can be added to enhance some desirable property of the finished product or increase the effectiveness of the sintering step. These additives may also be in the form of soluble salts, typically water soluble, and typically consist of a metal-containing compound which can be a precursor of the oxides of magnesium, zinc, cobalt, nickel, zirconium, hafnium, chromium and titanium. The addition of metal-containing compounds, such as those containing magnesium, zinc, cobalt and nickel, which form a spinel crystal structure, has generally been found to produce better abrasive grits than ceramics which do not contain spinel at the same yttria concentration, for example, at a yttria content of about 10% by weight.

Once the gel has formed, it may be shaped by any convenient method such as pressing, molding or extrusion and then carefully dried to produce the desired shape such as a rod, pyramid, diamond, cone and the like. Irregularly shaped abrasive grits are conveniently formed by simply depositing the gel in any convenient size of drying vessel such as one in the shape of a cake pan and drying the gel, usually at a temperature below the frothing temperature of the gel. Drying may be accomplished by simply air drying or using any of several other dewatering methods that are known in the art to remove the free water of the gel to form a solid.

After the solid is dried, it can be crushed or broken by any suitable means, such as a hammer or ball mill to form grits or particles. Any method for comminuting the solid can be used and the term "crushing" is used to include all of such methods.

After crushing, the dried gel can then be calcined to remove essentially all volatiles. The dry gel is generally heated to a temperature between 400° C. and about 800° C. and held within this temperature range until the free water and a substantial amount of the bound water is removed, preferably over 90 weight percent of the total water.

The calcined material is then sintered by heating to a temperature between about 1200° C. to about 1650° C. and holding within this temperature range until substantially all of the yttrium reacts with alumina to thereby be converted to yttrium-aluminum garnet and until substantially all of the remaining alumina is converted to alpha alumina. Of course, the length of time to which the calcined material must be exposed to the sintering temperature to achieve this level of conversion will depend upon various factors but usually from about 2 to about 30 minutes is sufficient.

Other steps can be included in this process, such as rapidly heating the material from the calcining temperature to the sintering temperature, sizing granular material, centrifuging the dispersion to remove sludge waste, etc. Moreover, this process may be modified by combining two or more of the individually described steps, if desired.

The conventional process steps and materials are more fully described in U.S. Pat. No. 4,314,827 and U.S. Pat. No. 4,518,397, these patents being herein incorporated by reference.

The ceramic materials according to the invention may have a density varying from near its theoretical density, e.g., 95% or greater, to about 75%. The ceramic material may be substantially void free or it may be characterized by including porosity, typically in the form of internal vermicular or equiaxial pores which are for the most part on the interior of the ceramic with a minor part of the pores extending to the surface. Porosity is very difficult to measure accurately by conventional porosity measuring techniques because the porosity is a mix of closed pores which do not extend to the surface and open pores which do.

The ceramic abrasive grits according to the present invention may be utilized in conventional abrasive products, preferably as a blend with less expensive conventional abrasive grits such as fused alumina, silicon carbide, garnet, fused alumina-zirconia and the like. It may also be blended with minerals or materials which are not noted as abrasives such as marble, glass, and the like.

Because of the relatively high cost of yttrium compounds, it is preferred to blend the ceramic abrasive grits of the present invention with less expensive abrasive minerals. Such blending of abrasive grits is known. A preferred method of blending is described in assignee's U.S. patent application Ser. No. 721,869 filed Apr. 10, 1985, involving a method known as selective mineral substitution wherein the coarse abrasive mineral is removed from an inexpensive abrasive grit charge that is to be utilized in an abrasive product such as a coated abrasive and is substituted with coarse mineral of the invention. It is recognized in that patent application that in any coated abrasive the coarse abrasive grits are substantially responsible for a major portion of the abrading of a workpiece. By such substitution, the improved abrasive grits of the present invention are interposed in an abrasive product between smaller grits of conventional abrasive mineral to permit the improved coarse abrasive grits to do the bulk of the abrading with such product. Aforementioned U.S. patent application Ser. No. 721,869 is incorporated herein by reference for its disclosure of this feature.

The ceramic abrasive grits of the present invention are conveniently handled and incorporated into various abrasive products according to well-known techniques to make, for example, coated abrasive products, bonded abrasive products, and lofty non-woven abrasive products. The method of making such abrasive products are well-known to those skilled in the art. A coated abrasive product includes a backing, for example, formed of fabric (e.g., woven or non-woven fabric such as paper) which may be impregnated with a filled binder material, a polymer film such as that formed of oriented heat-set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

It has been found that the addition of a grinding aid over the surface of the abrasive grits typically in the supersize coating provides an unexpectedly improved grinding performance when using a coated abrasive product containing the ceramic abrasive grits of the present invention. Grinding aids may also be added to the size coat or as particulate material. The preferred grinding aid is $KBF_4$, although other grinding aids are also believed to be useful. Other useful grinding aids include NaCl, sulfur, $K_2TiF_6$, polyvinylidene chloride, cryolite and combinations and mixtures thereof. The preferred amount of grinding aid is on the order of 50 to 300 g., preferably 80 to 160 g, per square meter of coated abrasive product.

Non-woven abrasive products typically include an open porous lofty polymer filament structure having the ceramic abrasive grits distributed throughout the structure and adherently bonded therein by an adhesive material. The method of making such non-woven abrasive products is well known.

Bonded abrasive products typically consist of a shaped mass of abrasive grits held together by an organic or ceramic binder material. The shaped mass is preferably in the form of a grinding wheel. The preferred binder materials for the ceramic abrasive grits of the invention are organic binders. Ceramic or vitrified binders may be used if they are curable at temperatures and under conditions which will not adversely affect the ceramic abrasive grits of the present invention.

EXAMPLES

The following examples are illustrative of certain specific embodiments of this invention; however, these examples are for illustrative purposes only and are not to be construed as limitations upon the invention. All parts are by weight, unless otherwise specified.

Examples 1-85

Alpha alumina/yttrium-aluminum garnet abrasive grits were prepared by sol gel process as follows:

Room temperature deionized water (2600 ml), 48 g of 16N analytical reagent grade nitric acid and 800 g alpha aluminum monohydrate powder sold under the trade designation "Disperal" were charged into an 18.9 liter polyethylene lined steel vessel. The charge was dispersed at high speed for five minutes using a Gifford-Wood Homogenizer Mixer (Greeco Corp., Hudson, N.H.). The resulting dispersion and an aqueous solution containing 35.9% yttrium nitrate hexahydrate were metered through an in-line mixer in an amount to provide the weight of yttrium nitrate solution specified in Table I. The resulting gel was extruded into a 46 cm×66 cm×5 cm polyester lined aluminum tray where it was dried in a forced air oven at 100° C. to a friable solid. The resultant dried material was crushed using a "Braun" type UD pulverizer having a 1.1 mm gap between the steel plates. The crushed material was screened and the 0.125 mm to about 1 mm screen size material was retained for firing.

The screened, crushed material was fed into the end of a calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 15 minutes. The calciner had a hot zone feed end temperature of 350° C. and exit end temperature of 800° C. The fired product from calciner was fed into a 1380° C. kiln which was a 8.9 cm diameter 1.32 meter long silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

Precursors of other modifies were added to examples 63-72 and 80-84 in the type and in the amounts specified in Table I.

TABLE I

| Example No. | $Y(NO_3)_3.6H_2O$ solution (g) | Other Additive Precursor (Type) | (g) |
|---|---|---|---|
| 1 | 88 | | |
| 2 | 166 | | |
| 3 | 265 | | |
| 4 | 353 | | |
| 5 | 465 | | |
| 6 | 585 | | |
| 7 | 505 | | |
| 8 | 606 | | |
| 9 | 714 | | |
| 10 | 819 | | |
| 11 | 959 | | |
| 12 | 585 | | |
| 13 | 585 | | |
| 14 | 585 | | |
| 15 | 585 | | |
| 16 | 585 | | |
| 17 | 585 | | |
| 18 | 585 | | |
| 19 | 585 | | |
| 20 | 504 | | |
| 21 | 504 | | |
| 22 | 504 | | |
| 23 | 504 | | |
| 24 | 504 | | |
| 25 | 504 | | |
| 26 | 504 | | |
| 27 | 504 | | |
| 28 | 504 | | |
| 29 | 504 | | |
| 30 | 504 | | |
| 31 | 504 | | |
| 32 | 504 | | |
| 33 | 504 | | |
| 34 | 504 | | |
| 35 | 504 | | |
| 36 | 504 | | |
| 37 | 504 | | |
| 38 | 504 | | |
| 39 | 504 | | |
| 40 | 606 | | |
| 41 | 504 | | |
| 42 | 408 | | |
| 43 | 357 | | |
| 44 | 504 | | |
| 45 | 408 | | |
| 46 | 317 | | |
| 47 | 231 | | |
| 48 | 504 | | |
| 49 | 408 | | |
| 50 | 324 | | |
| 51 | 231 | | |

TABLE I-continued

| Example No. | Y(NO$_3$)$_3$.6H$_2$O solution (g) | Other Additive Precursor (Type) | (g) |
|---|---|---|---|
| 52 | 182 | | |
| 53 | 150 | | |
| 54 | 119 | | |
| 55 | 89 | | |
| 56 | 58 | | |
| 57 | 28 | | |
| 58 | 504 | | |
| 59 | 408 | | |
| 60 | 325 | | |
| 61 | 232 | | |
| 62 | 317 | | |
| 63 | 254 | Mg(NO$_3$)$_2$.6H$_2$O | 110[1] |
| 64 | 182 | Mg(NO$_3$)$_2$.6H$_2$O | 223[1] |
| 65 | 119 | Mg(NO$_3$)$_2$.6H$_2$O | 338[1] |
| 66 | 58 | Mg(NO$_3$)$_2$.6H$_2$O | 455[1] |
| 67 | 357 | Alpha-Al$_2$O$_3$ | 150[2] |
| 68 | 254 | Co(NO$_3$)$_2$.6H$_2$O | 120[3] |
| 69 | 254 | Zn(NO$_3$)$_2$.6H$_2$O | 120[4] |
| 70 | 254 | Ni(NO$_3$)$_2$.6H$_2$O | 120[5] |
| 71 | 254 | Mg(NO$_3$)$_2$.6H$_2$O | 120[1] |
| 72 | 264 | ZrO(NO$_3$)$_2$.6H$_2$O | 194[6] |
| 73 | 317 | | |
| 74 | 44 | | |
| 75 | 36 | | |
| 76 | 29 | | |
| 77 | 22 | | |
| 78 | 14 | | |
| 79 | 7 | | |
| 80 | 59 | Mg(NO$_3$)$_2$.6H$_2$O | 112[1] |
| 81 | 61 | Mg(NO$_3$)$_2$.6H$_2$O | 464[1] |
| 82 | 154 | Mg(NO$_3$)$_2$.6H$_2$O | 295[1] |
| 83 | 251 | Mg(NO$_3$)$_2$.6H$_2$O | 120[1] |
| 84 | 260 | Mg(NO$_3$)$_2$.6H$_2$O | 496[1] |
| 85 | 504 | | |

Footnotes
[1] 5.5% MgO solids.
[2] nucleating agent (1:1 by weight aqueous dispersion).
[3] 5.5% CoO solids solution.
[4] 5.5% ZnO solids solution.
[5] 5.5% NiO solids solution.
[6] 20% ZrO$_2$ solids solution.

Table II shows the composition of the abrasive grits made in accordance with Examples 1-85. Table III reports the composition, based upon the weight of starting materials, as weight percent of aluminum oxide and weight percent of yttrium oxide.

The actual composition of the mineral, for example of the type described in Example 20, as observed by optical, scanning electron and transmission electron microscopic analysis reveals a rather well defined microstructure.

Optical microscopy reveals no sharp birefringence, indicating an alpha alumina crystal domain size of less than about 4 micrometers since alpha alumina is the only optically active phase which would reveal strong color birefringence and only when the crystal domain size is greater than 4 micrometers.

Scanning electron microscopy analysis was conducted on a coated polished sample of the type described in Example 20 with a light Au-Pd deposit on the polished surface using both secondary electron and background or back scatter electron imaging to determine the microcrystal and macrocrystal structure. The macrocrystal structure, best detected using back scatter electron imaging, revealed 1 to 2 micro diameter crystal domains containing darker inclusions and being surrounded by a Y$_2$O$_3$- rich bright ring or zone. The darker inclusions had a higher alpha alumina content and lower yttrium-aluminum garnet (3Y$_2$O$_3$-5Al$_2$O$_3$) content. The bright rings (zones) were rich in yttrium oxide and composed of yttrium-aluminum garnet and alpha alumina.

Transmission electron microscopy revealed 1 to 1.5 micrometer diameter alpha alumina crystal domains, each of which contained a plurality of 200-600 Å yttrium aluminum garnet inclusions, with a ring composed of alpha alumina and yttrium aluminum garnet surrounding the alpha alumina crystal domains.

Abrasive grits of each of the examples were made into coated abrasive products which were tested for abrasiveness. The coated abrasive products were made according to conventional coated abrasive making procedures. The abrasive grits were screened to yield various grain sizes or abrasive grit grades and the desired grade selected for the particular construction. The abrasive grits were bonded to polyester or vulcanized fiber backings using conventional make, size, and optionally supersize adhesive resin compositions.

Table II reveals the grit size (grade), the composition of the make resin, size resin, supersize resin, if used, and grinding aid, if used. The percent of mineral according to the invention (identified as "YAG") is also reported with the balance of 100% being fused alumina. Table II also reports the particular grinding test, grinding pressure, type of workpiece and grinding duration utilized in the grinding test for each of Examples 1-85. In Table II, the given grade size refers to abrasive grit having an average diameter as follows:

| Grade | Average Diameter (micrometers) |
|---|---|
| 36 | 650 |
| 50 | 430 |
| 60 | 340 |
| 80 | 240 |

The terms "belt" test and "disc" test refer to belt and disc tests hereinafter described.

The disc test involved the testing of 17.8 cm diameter abrasive discs having the following approximate coating weights:

| Grade | Make Resin | Mineral | Size Resin | Supersize |
|---|---|---|---|---|
| 36 | 4.2 g | 18.8 g | 13.6 g | 8 g |
| 50 | 4.2 g | 13.2 g | 8.7 g | 6 g |

The abrasive belts were made of 6.35 cm×335 cm butt spliced strips. The approximate coating weights of the abrasive belts were as follows:

| Grade | Make Resin | Mineral | Size Resin | Supersize |
|---|---|---|---|---|
| 36 | 70 | 218 | 91 | 35 |
| 50 | 57 | 146 | 68 | 26 |
| 60 | 51 | 121 | 58 | 22 |
| 80 | 43 | 90 | 47 | 18 |

Disc Test

The discs were prepared using conventional coated abrasive making procedures, conventional 0.76 mm vulcanized fiber backings and conventional calcium carbonate-filled phenolic resin make and size resins, without adjusting for mineral density differences. The make resin was precured for 90 minutes at 88° C. and the size resin precured for 90 minutes at 88° C. followed by a final cure of 100° C. for 10 hours. The coating was done using conventional techniques in a one-trip operation with curing in a forced air oven. The cured discs were first conventionally flexed to controllably break the hard bonding resins, mounted on a beveled aluminum back-up pad, and used to grind the face of a 2.5 cm by 18 cm steel workpiece. The identity of the workpiece is set forth in Table II. The workpiece identified as "304SS" refers to 304 Stainless Steel while "1018MS" refers to 1018 Mild Steel. The disc was driven at 5,500 rpm while the portion of the disc overlaying the beveled edge of the back-up pad contacted the workpiece at the pressure designated in Table II, generating a disc wear path of about 140 cm². Each disc was used to grind a separate workpiece for one minute each for the time designated as grinding duration. The total cut for each disc is reported in Table III. The relative cumulative cut of each of the 12 cuts for each disc, using the cumulative cut of a disc made of a control adhesive grain as 100%, was calculated and is also tabulated in Table III. In Table III "Cubitron" refers to the ceramic abrasive grain sold under the trade designation "Cubitron". "Norzon" refers to the fused alumina-zirconia abrasive grain used under the trade designation "Norzon".

Belt Test

The abrasive grain samples which were used to make coated abrasives which were converted to endless abrasive belts were tested on a constant load surface grinder by abrading the 2.5×18 cm face of a steel workpiece of the type designated in Table II with successive 60 second grinding passes, weighing and cooling after each pass, employing the pressure and workpiece set forth in Table II. The workpiece was oriented with its long dimension vertical and, during abrading, was moved vertically in a 18.4 cm path in a cycle from its original position and back again for the duration in minutes shown in Table II. Grinding results are shown in Table III both as "total cut" and as a relative amount ("relative cut") when compared to control abrasive belts made in the same manner of the designated known abrasive grain.

In Table II, resin "A" consisted of 52 weight percent calcium carbonate and 48 weight percent phenol-formaldehyde phenolic resin. Resin "B" consisted of 68 weight percent calcium carbonate and 32 weight percent phenol-formaldehyde resin. Resin "C" consisted of 76.25 weight percent $KBF_4$ dispersed in amine curable epoxy resin and sufficient amine curing agent to cure the resin. Resin "D" contained 68 weight percent $KBF_4$ and 32 weight percent phenol-formaldehyde resin with sufficient wetting agent to suspend the $KBF_4$. The resin compositions were typically coated from a solvent solution. Resin "E" consisted of 66 weight percent cryolite, 32 weight percent phenol-formaldehyde phenolic resin and 2 weight percent iron oxide.

TABLE II

| Ex. No. | Grade | Make Resin | Size Resin | Super Size Resin | Grinding Aid | Mineral % YAG | Grinding Test | Grinding Pressure (kg/cm²) | Workpiece | Grinding Duration (min) |
|---|---|---|---|---|---|---|---|---|---|---|
| 1 | 50 | A | B | NONE | NONE | 100 | DISC | 1.41 | 304SS | 12 |
| 2 | 50 | A | B | NONE | NONE | 100 | DISC | 1.41 | 304SS | 12 |
| 3 | 50 | A | B | NONE | NONE | 100 | DISC | 1.41 | 304SS | 12 |
| 4 | 50 | A | B | NONE | NONE | 100 | DISC | 1.41 | 304SS | 12 |
| 5 | 50 | A | B | NONE | NONE | 100 | DISC | 1.41 | 304SS | 12 |
| 6 | 50 | A | B | NONE | NONE | 100 | DISC | 1.41 | 304SS | 12 |
| 7 | 36 | A | D | NONE | $KBF_4$ | 100 | DISC | 0.92 | 304SS | 12 |
| 8 | 36 | A | D | NONE | $KBF_4$ | 100 | DISC | 0.92 | 304SS | 12 |
| 9 | 36 | A | D | NONE | $KBF_4$ | 100 | DISC | 0.92 | 304SS | 12 |
| 10 | 36 | A | C | NONE | $KBF_4$ | 100 | DISC | 0.92 | 304SS | 12 |
| 11 | 36 | A | C | NONE | $KBF_4$ | 100 | DISC | 0.92 | 304SS | 12 |
| 12 | 36 | A | B | C | $KBF_4$ | 100 | BELT | 2.11 | 304SS | 30 |
| 13 | 36 | A | B | C | $KBF_4$ | 17 | BELT | 2.11 | 304SS | 30 |
| 14 | 50 | A | B | C | $KBF_4$ | 100 | BELT | 1.76 | 304SS | 30 |
| 15 | 50 | A | B | C | $KBF_4$ | 10 | BELT | 1.76 | 304SS | 30 |
| 16 | 80 | A | B | C | $KBF_4$ | 100 | BELT | 1.06 | 304SS | 30 |
| 17 | 80 | A | B | C | $KBF_4$ | 11 | BELT | 1.06 | 304SS | 30 |
| 18 | 50 | A | D | NONE | $KBF_4$ | 100 | DISC | 1.06 | 304SS | 12 |
| 19 | 50 | A | D | NONE | $KBF_4$ | 10 | DISC | 1.06 | 304SS | 12 |
| 20 | 60 | A | E | NONE | CRYOLITE | 10 | BELT | 1.41 | 304SS | 20 |
| 21 | 60 | A | E | C | CRYOLITE + $KBF_4$ | 10 | BELT | 1.41 | 304SS | 30 |
| 22 | 80 | A | B | C | $KBF_4$ | 100 | BELT | 1.06 | 304SS | 30 |
| 23 | 80 | B | C | NONE | $KBF_4$ | 100 | BELT | 1.06 | 304SS | 30 |
| 24 | 80 | A | B | C | $KBF_4$ | 10 | BELT | 1.06 | 304SS | 30 |
| 25 | 80 | A | C | NONE | $KBF_4$ | 10 | BELT | 1.06 | 304SS | 30 |
| 26 | 80 | A | B | D | $KBF_4$ | 10 | BELT | 1.06 | 304SS | 30 |
| 27 | 80 | A | B | NONE | NONE | 10 | BELT | 1.06 | 304SS | 30 |
| 28 | 80 | A | B | C | $KBF_4$ | 100 | BELT | 1.06 | TITANIUM | 15 |
| 29 | 80 | A | B | C | $KBF_4$ | 10 | BELT | 1.06 | TITANIUM | 20 |
| 30 | 80 | A | B | C | $KBF_4$ | 100 | BELT | 1.06 | 1018MS | 40 |
| 31 | 80 | A | B | C | $KBF_4$ | 10 | BELT | 1.06 | 1018MS | 40 |
| 32 | 50 | A | B | $C^2$ | NaCl | 100 | DISC | 1.06 | 304SS | 12 |
| 33 | 50 | A | B | C | $KBF_4$ | 100 | DISC | 1.06 | 304SS | 12 |
| 34 | 50 | A | B | $C^2$ | $CaCO_3$ | 100 | DISC | 1.06 | 304SS | 12 |
| 35 | 50 | A | B |  | $GEON^1$ | 100 | DISC | 1.06 | 304SS | 12 |
| 36 | 50 | A | B | $C^2$ | $Na_2CO_3$ | 100 | DISC | 1.06 | 304SS | 12 |
| 37 | 50 | A | B | $C^2$ | SULFUR | 100 | DISC | 1.06 | 304SS | 12 |
| 38 | 50 | A | B | $C^2$ | $K_2TiF_6$ | 100 | DISC | 1.06 | 304SS | 12 |
| 39 | 50 | A | B | $C^2$ | $K_2HPO_4$ | 100 | DISC | 1.06 | 304SS | 12 |
| 40 | 50 | A | B | C | $KBF_4$ | 100 | DISC | 0.92 | 304SS | 12 |
| 41 | 50 | A | B | C | $KBF_4$ | 100 | DISC | 0.92 | 304SS | 12 |
| 42 | 50 | A | B | C | $KBF_4$ | 100 | DISC | 0.92 | 304SS | 12 |

TABLE II-continued

| Ex. No. | Grade | Make Resin | Size Resin | Super Size Resin | Grinding Aid | Mineral % YAG | Grinding Test | Grinding Pressure (kg/cm$^2$) | Workpiece | Grinding Duration (min) |
|---|---|---|---|---|---|---|---|---|---|---|
| 43 | 50 | A | B | C | KBF$_4$ | 100 | DISC | 0.92 | 304SS | 12 |
| 44 | 36 | A | B | C | KBF$_4$ | 100 | DISC | 0.92 | 304SS | 12 |
| 45 | 36 | A | B | C | KBF$_4$ | 100 | DISC | 0.92 | 304SS | 12 |
| 46 | 36 | A | B | C | KBF$_4$ | 100 | DISC | 0.92 | 304SS | 12 |
| 47 | 36 | A | B | C | KBF$_4$ | 100 | DISC | 0.92 | 304SS | 12 |
| 48 | 50 | A | B | C | KBF$_4$ | 10 | DISC | 0.92 | 304SS | 12 |
| 49 | 50 | A | B | C | KBF$_4$ | 10 | DISC | 0.92 | 304SS | 12 |
| 50 | 50 | A | B | C | KBF$_4$ | 10 | DISC | 0.92 | 304SS | 12 |
| 51 | 50 | A | B | C | KBF$_4$ | 10 | DISC | 0.92 | 304SS | 12 |
| 52 | 50 | A | B | C | KBF$_4$ | 100 | DISC | 0.92 | 304SS | 12 |
| 53 | 50 | A | B | C | KBF$_4$ | 100 | DISC | 0.92 | 304SS | 12 |
| 54 | 50 | A | B | C | KBF$_4$ | 100 | DISC | 0.92 | 304SS | 12 |
| 55 | 50 | A | B | C | KBF$_4$ | 100 | DISC | 0.92 | 304SS | 12 |
| 56 | 50 | A | B | C | KBF$_4$ | 100 | DISC | 0.92 | 304SS | 12 |
| 57 | 50 | A | B | C | KBF$_4$ | 100 | DISC | 0.92 | 304SS | 12 |
| 58 | 50 | A | B | C | KBF$_4$ | 20 | DISC | 1.76 | 304SS | 30 |
| 59 | 50 | A | B | C | KBF$_4$ | 20 | DISC | 1.76 | 304SS | 30 |
| 60 | 50 | A | B | C | KBF$_4$ | 20 | DISC | 1.76 | 304SS | 30 |
| 61 | 50 | A | B | C | KBF$_4$ | 20 | DISC | 1.76 | 304SS | 30 |
| 62 | 36 | A | B | C | KBF$_4$ | 100 | DISC | 0.92 | 304SS | 12 |
| 63 | 50 | A | B | C | KBF$_4$ | 100 | DISC | 0.92 | 304SS | 12 |
| 64 | 50 | A | B | C | KBF$_4$ | 100 | DISC | 0.92 | 304SS | 12 |
| 65 | 50 | A | B | C | KBF$_4$ | 100 | DISC | 0.92 | 304SS | 12 |
| 66 | 36 | A | B | C | KBF$_4$ | 100 | DISC | 0.92 | 304SS | 12 |
| 67 | 36 | A | B | C | KBF$_4$ | 100 | DISC | 0.92 | 304SS | 12 |
| 68 | 36 | A | B | C | KBF$_4$ | 100 | DISC | 0.92 | 304SS | 12 |
| 69 | 36 | A | B | C | KBF$_4$ | 100 | DISC | 0.92 | 304SS | 12 |
| 70 | 36 | A | B | C | KBF$_4$ | 100 | DISC | 0.92 | 304SS | 12 |
| 71 | 36 | A | B | C | KBF$_4$ | 100 | DISC | 0.92 | 304SS | 12 |
| 72 | 36 | A | B | C | KBF$_4$ | 100 | DISC | 0.92 | 304SS | 12 |
| 73 | 36 | A | B | C | KBF$_4$ | 100 | DISC | 0.92 | 304SS | 12 |
| 74 | 50 | A | B | C | KBF$_4$ | 100 | DISC | 0.92 | 304SS | 12 |
| 75 | 50 | A | B | C | KBF$_4$ | 100 | DISC | 0.92 | 304SS | 12 |
| 76 | 50 | A | B | C | KBF$_4$ | 100 | DISC | 0.92 | 304SS | 12 |
| 77 | 50 | A | B | C | KBF$_4$ | 100 | DISC | 0.92 | 304SS | 12 |
| 78 | 50 | A | B | C | KBF$_4$ | 100 | DISC | 0.92 | 304SS | 12 |
| 79 | 50 | A | B | C | KBF$_4$ | 100 | DISC | 0.92 | 304SS | 12 |
| 80 | 50 | A | B | C | KBF$_4$ | 20 | BELT | 1.76 | 304SS | 30 |
| 81 | 50 | A | B | C | KBF$_4$ | 20 | BELT | 1.76 | 304SS | 30 |
| 82 | 50 | A | B | C | KBF$_4$ | 100 | BELT | 1.76 | 304SS | 30 |
| 83 | 50 | A | B | C | KBF$_4$ | 20 | BELT | 1.76 | 304SS | 30 |
| 84 | 50 | A | B | C | KBF$_4$ | 20 | BELT | 1.76 | 304SS | 30 |
| 85 | 36 | A | A | C | KBF$_4$ | 15 | BELT | 1.76 | Waspalloy | 15 |

[1]Polyvinylidene chloride available under the trade designation "Geon" 660X1.
[2]Resin C was modified by substituting the designated grinding aid for KBF$_4$.

TABLE III

| No. | Al$_2$O$_3$ (%) | Y$_2$O$_3$ (%) | Other (type) | Other (%) | Cut Total(g) | Cut Relative (%) | Control |
|---|---|---|---|---|---|---|---|
| 1 | 97 | 3 | | | 86 | 80 | CUBITRON |
| 2 | 94.5 | 5.5 | | | 104 | 95 | CUBITRON |
| 3 | 91.5 | 8.5 | | | 130 | 125 | CUBITRON |
| 4 | 89 | 11 | | | 127 | 120 | CUBITRON |
| 5 | 86 | 14 | | | 140 | 130 | CUBITRON |
| 6 | 83 | 17 | | | 167 | 150 | CUBITRON |
| 7 | 85 | 15 | | | 243 | 177 | NORZON |
| 8 | 82.5 | 17.5 | | | 253 | 185 | NORZON |
| 9 | 80 | 20 | | | 217 | 158 | NORZON |
| 10 | 78.5 | 22.5 | | | 154 | 112 | NORZON |
| 11 | 75 | 25 | | | 144 | 105 | NORZON |
| 12 | 83 | 17 | | | 1760 | 132 | NORZON |
| 13 | 83 | 17 | | | 1060 | 79 | NORZON |
| 14 | 83 | 17 | | | 1578 | 134 | NORZON |
| 15 | 83 | 17 | | | 1055 | 90 | NORZON |
| 16 | 83 | 17 | | | 1097 | 143 | NORZON |
| 17 | 83 | 17 | | | 701 | 92 | NORZON |
| 18 | 83 | 17 | | | 357 | 202 | NORZON |
| 19 | 83 | 17 | | | 205 | 116 | NORZON |
| 20 | 85 | 15 | | | 605 | 42 | NORZON |
| 21 | 85 | 15 | | | 1204 | 97 | NORZON |
| 22 | 85 | 15 | | | | 512 | Fused Al$_2$O$_3$ |
| 23 | 85 | 15 | | | | 316 | Fused Al$_2$O$_3$ |
| 24 | 85 | 15 | | | | 333 | Fused Al$_2$O$_3$ |
| 25 | 85 | 15 | | | | 200 | Fused Al$_2$O$_3$ |
| 26 | 85 | 15 | | | | 318 | Fused Al$_2$O$_3$ |

TABLE III-continued

| No. | Al₂O₃ (%) | Y₂O₃ (%) | Other (type) | Other (%) | Cut Total(g) | Relative (%) | Control |
|---|---|---|---|---|---|---|---|
| 27 | 85 | 15 | | | | 118 | Fused Al₂O₃ |
| 28 | 85 | 15 | | | | 208 | Fused Al₂O₃ |
| 29 | 85 | 15 | | | | 152 | Fused Al₂O₃ |
| 30 | 85 | 15 | | | | 159 | Fused Al₂O₃ |
| 31 | 85 | 15 | | | | 122 | Fused Al₂O₃ |
| 32 | 85 | 15 | | | 112 | 223 | Fused Al₂O₃ |
| 33 | 85 | 15 | | | 263 | 526 | Fused Al₂O₃ |
| 34 | 85 | 15 | | | 100 | 200 | Fused Al₂O₃ |
| 35 | 85 | 15 | | | 226 | 450 | Fused Al₂O₃ |
| 36 | 85 | 15 | | | 89 | 178 | Fused Al₂O₃ |
| 37 | 85 | 15 | | | 267 | 533 | Fused Al₂O₃ |
| 38 | 85 | 15 | | | 240 | 480 | Fused Al₂O₃ |
| 39 | 85 | 15 | | | 96 | 192 | Fused Al₂O₃ |
| 40 | 82.5 | 17.5 | | | 419 | 331 | NORZON |
| 41 | 85 | 15 | | | 401 | 317 | NORZON |
| 42 | 87.5 | 12.5 | | | 440 | 348 | NORZON |
| 43 | 90 | 10 | | | 400 | 316 | NORZON |
| 44 | 84.4 | 15.6 | | | 300 | 203 | NORZON |
| 45 | 86.6 | 13.4 | | | 301 | 204 | NORZON |
| 46 | 89.2 | 10.8 | | | 297 | 201 | NORZON |
| 47 | 90.7 | 9.3 | | | 329 | 222 | NORZON |
| 48 | 84.4 | 15.6 | | | 182 | 131 | Fused Al₂O₃ |
| 49 | 86.6 | 13.4 | | | 177 | 127 | Fused Al₂O₃ |
| 50 | 89.2 | 10.8 | | | 222 | 160 | Fused Al₂O₃ |
| 51 | 90.7 | 9.3 | | | 194 | 139 | Fused Al₂O₃ |
| 52 | 94.3 | 5.7 | | | 271 | 156 | NORZON |
| 53 | 95.6 | 4.4 | | | 275 | 158 | NORZON |
| 54 | 96.1 | 3.9 | | | 274 | 157 | NORZON |
| 55 | 96.4 | 3.6 | | | 273 | 157 | NORZON |
| 56 | 97.7 | 2.3 | | | 243 | 140 | NORZON |
| 57 | 98.7 | 1.3 | | | 211 | 121 | NORZON |
| 58 | 84.4 | 15.6 | | | 1701 | 113 | NORZON |
| 59 | 86.6 | 13.4 | | | 1661 | 111 | NORZON |
| 60 | 89.2 | 10.8 | | | 1509 | 100 | NORZON |
| 61 | 90.7 | 9.3 | | | 1387 | 92 | NORZON |
| 62 | 90 | 10 | | | 294 | 170 | NORZON |
| 63 | 90.9 | 8.08 | MgO | 1.01 | 324 | 188 | NORZON |
| 64 | 91.84 | 6.25 | MgO | 2.04 | 269 | 156 | NORZON |
| 65 | 92.78 | 4.12 | MgO | 3.09 | 293 | 170 | NORZON |
| 66 | 93.75 | 2.1 | MgO | 4.15 | 249 | 144 | NORZON |
| 67 | 80 | 10 | Alpha | 10.0 | 234 | 133 | NORZON |
| 68 | 90.9 | 8.1 | MgO | 1.0 | 424 | 243 | NORZON |
| 69 | 90.9 | 8.1 | MgO | 1.0 | 350 | 201 | NORZON |
| 70 | 90.9 | 8.1 | MgO | 1.0 | 425 | 244 | NORZON |
| 71 | 90.9 | 8.1 | MgO | 1.0 | 431 | 247 | NORZON |
| 72 | 86.5 | 8.0 | ZrO₂ | 5.6 | 303 | 174 | NORZON |
| 73 | 90 | 10 | | | 386 | 221 | NORZON |
| 74 | 98.5 | 1.5 | | | 140 | 100 | NORZON |
| 75 | 98.75 | 1.25 | | | 112 | 81 | NORZON |
| 76 | 99 | 1 | | | 92 | 66 | NORZON |
| 77 | 99.25 | 0.75 | | | 77 | 55 | NORZON |
| 78 | 99.5 | 0.5 | | | 75 | 53 | NORZON |
| 79 | 99.75 | 0.25 | | | 54 | 39 | NORZON |
| 80 | 97 | 2 | MgO | 1 | 1623 | 113 | NORZON |
| 81 | 94 | 2 | MgO | 4 | 1738 | 121 | NORZON |
| 82 | 92.5 | 5 | MgO | 2.5 | 1943 | 135 | NORZON |
| 83 | 91 | 8 | MgO | 1 | 2060 | 143 | NORZON |
| 84 | 88 | 8 | MgO | 4 | 1995 | 139 | NORZON |
| 85 | 85 | 15 | | | 430 | 198 | NORZON |

We claim:

1. Ceramic abrasive grits comprising alpha alumina and at least about 0.5% by weight yttria.

2. The ceramic abrasive grits of claim 1 wherein said yttria is in the form of a garnet phase.

3. The ceramic abrasive grits of claim 1 in which the yttria content is from about 1 to about 30% by weight.

4. The ceramic abrasive grits of claim 1 further including a nucleating agent.

5. The ceramic abrasive grits of claim 1 characterized by being shaped.

6. An abrasive product comprising said ceramic abrasive grits of claim 1.

7. The abrasive product of claim 6 wherein said abrasive product is a coated abrasive product comprising a backing having adhesively bonded to one side thereof said ceramic abrasive grits.

8. The abrasive product of claim 6 wherein said abrasive product is a bonded abrasive product comprising a shaped mass of said ceramic abrasive grits and binder materials.

9. The abrasive product of claim 6 wherein said shaped mass is in the form of a grinding wheel.

10. The abrasive product of claim 6 wherein said abrasive product is a lofty non-woven abrasive product comprising an open porous lofty polymer filament structure having said ceramic abrasive grits distributed throughout said structure and adhesively bonded therein by an adhesive material.

11. A coated abrasive sheet material comprising a backing having bonded to at least one side thereof abrasive grits in coarse and fine size grades with at least a portion of the coarse grits being ceramic abrasive grits comprising alpha alumina and at least about 0.5% by weight yttria.

12. The coated abrasive sheet material of claim 11 wherein said ceramic abrasive grits are shaped.

13. The coated abrasive sheet material of claim 11 wherein said ceramic abrasive grits contain a nucleating agent.

14. The coated abrasive sheet material of claim 11 wherein substantially all of said coarse grits comprise said ceramic abrasive grits.

15. The coated abrasive sheets material of claim 11 wherein substantially all of said abrasive grits comprise said ceramic abrasive grits.

16. The coated abrasive sheet material of claim 11 further including a grinding aid.

17. The coated abrasive sheet material of claim 16 wherein said grinding aid is $KBF_4$.

18. A method of making ceramic abrasive grits, said method comprising the steps of:
  a. mixing an aqueous dispersion of alpha alumina monohydrate and yttrium compound in an amount to provide at least about 0.5% by weight yttria after firing;
  b. gelling the resultant mixture;
  c. drying the gel to produce a dried solid;
  d. crushing the dried material to produce grits;
  e. calcining the dried grits to substantially remove bound volatile materials; and
  f. firing the grits to produce a ceramic material.

19. The method of claim 18 wherein said yttrium compound is a yttrium salt of a volatile anion.

20. The method of claim 18 further including the step of shaping the gelled material.

21. The method of claim 20 wherein the shaping is by extrusion.

22. The method of claim 18 further including the step of adding a nucleating agent to the aqueous dispersion.

23. A method of grinding a workpiece surface comprising:
  a. causing rapid surface movement of an abrasive article comprised of ceramic abrasive grits comprising alpha alumina and at least about 0.5% by weight yttria; and
  b. moving the surface of said abrasive article into surface grinding contact with said workpiece surface.

24. The method of claim 23 wherein said workpiece is made of stainless steel.

25. The method of claim 23 wherein said abrasive article also includes a grinding aid.

26. The method of claim 25 wherein said grinding aid is $KBF_4$.

27. The method of claim 23 wherein said abrasive product is a coated abrasive sheet material.

28. The method of claim 27 wherein said coated abrasive sheet material is in the form of a rotatable disc.

29. The method of claim 27 wherein said coated abrasive comprises a backing having bonded to at least one side thereof abrasive grits in coarse and fine size grades with at least a portion of the coarse grits being said ceramic abrasive grits.

30. The method of claim 29 wherein substantially all of said coarse grits comprise said ceramic abrasive grits.

31. The method of claim 29 wherein substantially all of said grits comprise said ceramic abrasive grits.

32. The ceramic abrasive grits of claim 1 also including a modifying additive.

33. The ceramic abrasive grits of claim 32 wherein said modifying additive is an oxide of a metal selected from the group consisting of magnesium, zinc, cobalt, nickel, zirconium, hafnium, chromium, titanium and mixtures thereof.

34. The ceramic abrasive grits of claim 32 wherein said modifying additive forms a spinel crystal structure with alumina.

35. The ceramic abrasive grits of claim 34 wherein said spinel crystal structure comprises magnesia-alumina.

36. An abrasive article comprising the ceramic abrasive grits of claim 32.

37. The method of claim 18 further including the step of adding a precursor of a modifying additive to the aqueous dispersion.

38. The method of claim 37 wherein said precursor comprises $Mg(NO_3)_2 \cdot 6H_2O$.

39. Abrasive grits comprising ceramic produced by a sol-gel process, said ceramic comprising alpha alumina and at least about 0.5 percent by weight yttria.

40. Abrasive grits comprising ceramic material having a crystalline structure comprising inclusions which have a high alpha alumina content and a low yttrium-aluminum-garnet content surrounded by a zone having a higher yttrium-aluminum garnet content and a lower alpha alumina content.

* * * * *